July 30, 1957  C. W. LINCOLN ET AL  2,800,801
IN-LINE HYDRAULIC POWER STEERING GEAR
Filed June 16, 1954  2 Sheets-Sheet 1

INVENTORS
Clovis W. Lincoln,
Philip B. Zeigler, &
Joseph J. Verbrugge
Attorney

July 30, 1957  C. W. LINCOLN ET AL  2,800,801
IN-LINE HYDRAULIC POWER STEERING GEAR
Filed June 16, 1954  2 Sheets-Sheet 2

INVENTORS
Clovis W. Lincoln,
Philip B. Zeigler, &
Joseph J. Verbrugge
By C. H. Ditte
Attorney

United States Patent Office 2,800,801
Patented July 30, 1957

2,800,801
IN-LINE HYDRAULIC POWER STEERING GEAR

Clovis W. Lincoln, Philip B. Zeigler, and Joseph J. Verbrugge, Saginaw, Mich., assignors to General Motors Corporation, Detroit, Mich., a corporation of Delaware Application June 16, 1954, Serial No. 437,188

9 Claims. (Cl. 74—388)

This invention relates to fluid power steering and more particularly concerns a hydraulic power steering gear of unique consrtuction and operation.

The increasing number of accessory devices with which automobiles are being equipped presents a very real problem to engineers and designers charged with finding room for the accessories and the associated equipment. The problem is complicated by the fact that in most cases either the accessory itself or some related part must by practical necessity be located under the engine hood or bonnet. In such a circumstance, any new accessory of the type associated with normal or standard equipment so as to modify or improve the operation thereof, if ideally designed, would not substantially increase space requirements over those pre-existing.

As indicated, our invention has as its principal object to provide power steering apparatus of such character that it may be built into a standard steering gear, so to speak, without substantially increasing the over-all dimensions of the gear.

A corollary object of the invention is to accomplish the foregoing object without any sacrifice in operating characteristics and efficiency.

Still other objects and features of the invention will be apparent from the following description of a preferred embodiment thereof. The description will proceed with reference to the accompanying drawings in which.

Figure 1:
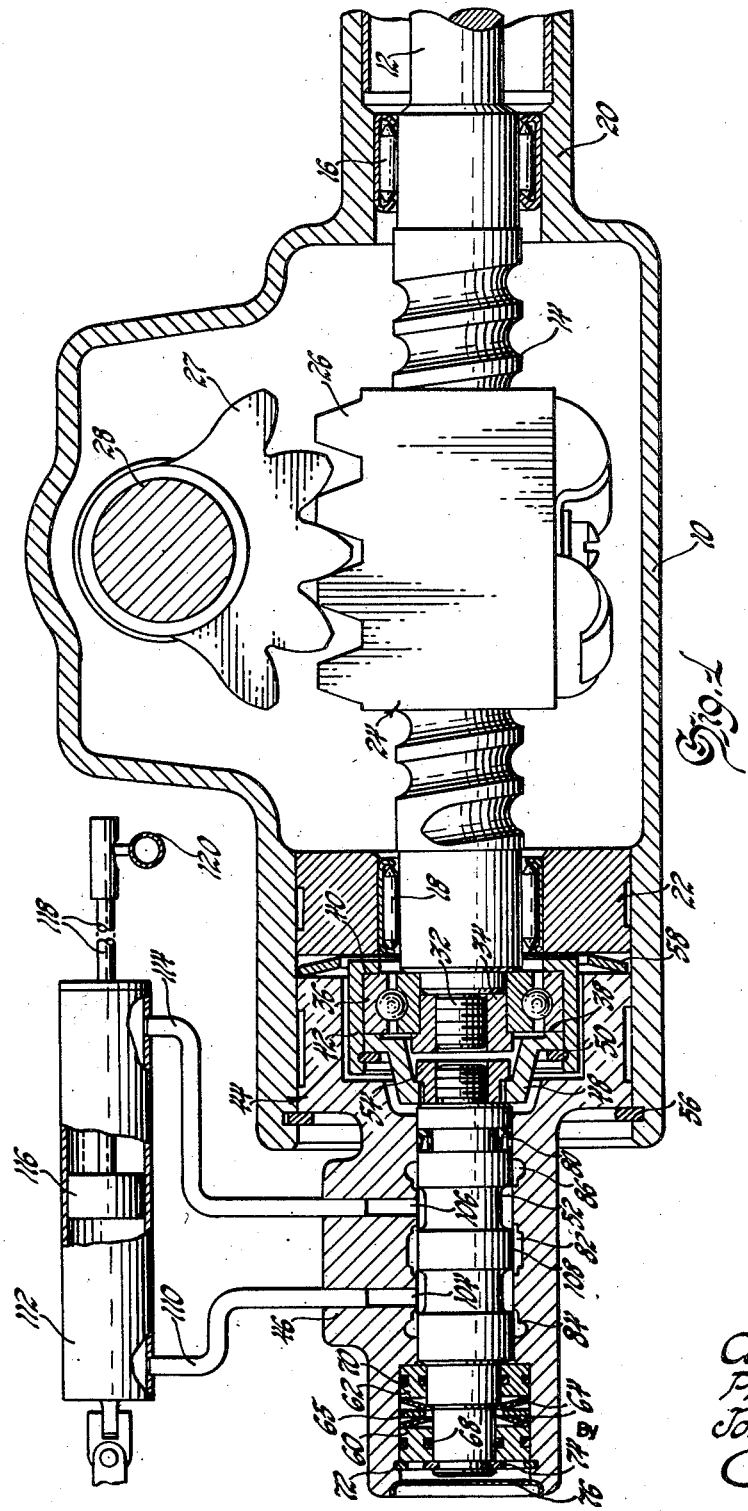
Figure 1 is a longitudinal section taken on the line 1—1 in Figure 2.
Figure 2:
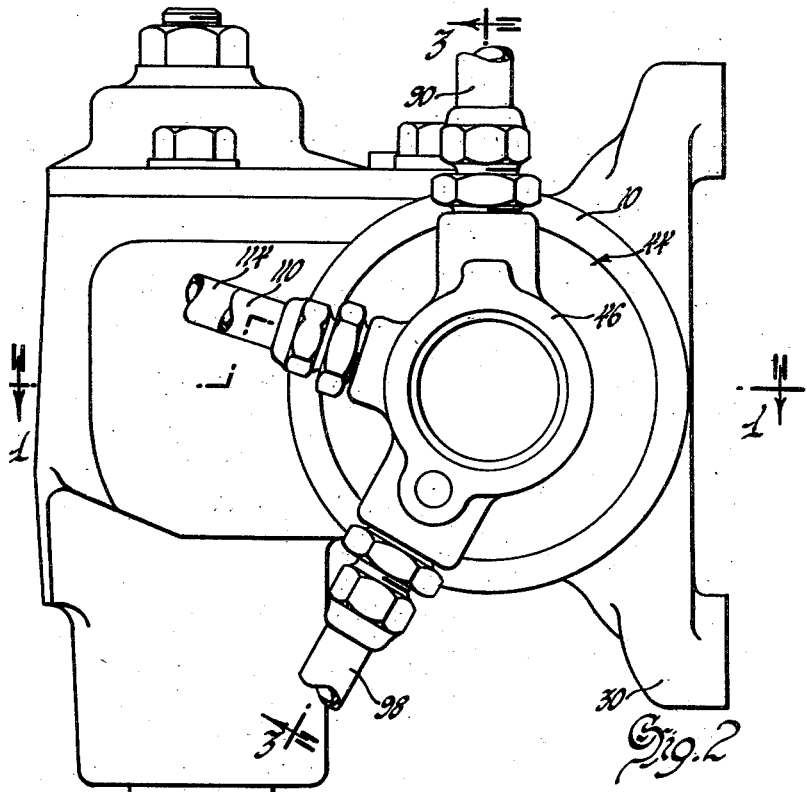
Figure 2 is an end view of the steering gear assembly.

In the drawings, and referring first to Figures 1 and 2, the numeral 10 denotes a casing or gear box receiving the worm end of a steering shaft 12. The worm 14 rotates in needle bearings 16, 18, the bearings being respectively positioned within a boss portion 20 of the casing and within an adapter 22, suitably secured within the casing.

Ball nut 24, carried by the worm 14 within the casing 10, is of conventional design and need not be described in any detail here. Suffices it to say, that the nut carries rack teeth 26 meshing with the teeth of a gear sector 27 fast on the cross shaft 28, which should be understood as operably connected with the steering linkage, not shown. The entire assembly illustrated is adapted for connection to the frame of the vehicle by a flange portion 30, seen in Figure 2.

Worm 14 terminates below the adaptor 22 in a threaded stud 32. A nut 34 is threaded on the stud to hold a ball bearing 36 against the annular shoulders 38 and 40, of which the latter is provided by a retainer 42 fitted into the right hand end 44 of a valve housing 46. The latter is assembled to the casing 10 by means of a snap ring 56 and a Belleville-type spring washer 58 serving to take up manufacturing tolerances.

A connector 48 is held against the left-hand face of the outer component of bearing 36 by a lock ring 50. This connector is fastened to the spool portion 52 of the valve through a nut 54.

Spool 52 terminates at its lower or left-hand end in a stepped shank portion. Annuli 60, 62, separated by spring washers 64 and by a spacer ring 65, are formed to accommodate oil seals 68 and 70. All of these parts are retained in proper relation by a pair of lock rings 72, 74 just inwardly of a dust shield 76. The lock rings are accommodated in grooves formed in the valve housing and the shank portion of the spool, respectively. An annular seal 80 near the opposite end of the spool 52 prevents leakage of fluid into the chamber housing the retainer 42 and the associated parts.

Housing 46 is counterbored to provide annular channels 82, 84 and 86. Channel 82 is open to a passageway 88 (Figure 3) connecting with a conduit 90 extending to a pump 92 drawing from a reservoir 94. The pump and reservoir are illustrated diagrammatically as these parts are well known in the art. Normally the pump is powered from the engine of the vehicle, being usually belted to the crank shaft. As indicated, hydraulic operation of the gear is preferred, but the same may be adapted for air or vacuum operation, for example.

Annular channels 84 and 86 are both open to a passageway 96, in turn communicating with a conduit 98 extending to the reservoir 94. The bore made to provide passageway 96 is closed by a ball 100 pressed into the valve housing. A smaller ball 102 serves a similar purpose.

Reverting now to Figure 1, there will be seen a pair of passageways 104, 106, disposed at either side of the central land 108 of the valve spool. Passageway 104 communicates with a line 110 leading to the left-hand end of a fluid motor including a power cylinder 112 confining a piston 116, the shaft 118 of which is adapted for connection with a steering linkage member 120. Passageway 106 connects with a line 114 extending to the right hand end of the power cylinder.

Valve 46, 52 is of the so-called "open-center" type; i. e., with the spool centered in the valve housing as shown, and with the pump 92 in operation, fluid is continuously circulated through the valve against the static pressure of the fluid in the power cylinder or fluid motor 112.

It is believed obvious that any resistance of the cross or rock shaft 28 to turning incident to the rotation of the steering shaft 12 will result in a reactionary thrust on the steering shaft tending to impart axial movement thereto. It is this axial movement which is utilized to bring about actuation of the spool 52 with energization of the fluid motor. Assuming downward or left-hand axial movement of the steering shaft, corresponding to a right turn, the spool will be displaced downwardly, a condition resulting in the creation of a pressure differential within the fluid motor in favor of the right-hand chamber thereof. Conversely, upward or rightward axial movement of the steering shaft 12 brings about upward displacement of the spool with consequent pressurization of the lefthand chamber of the motor.

Figure 3:
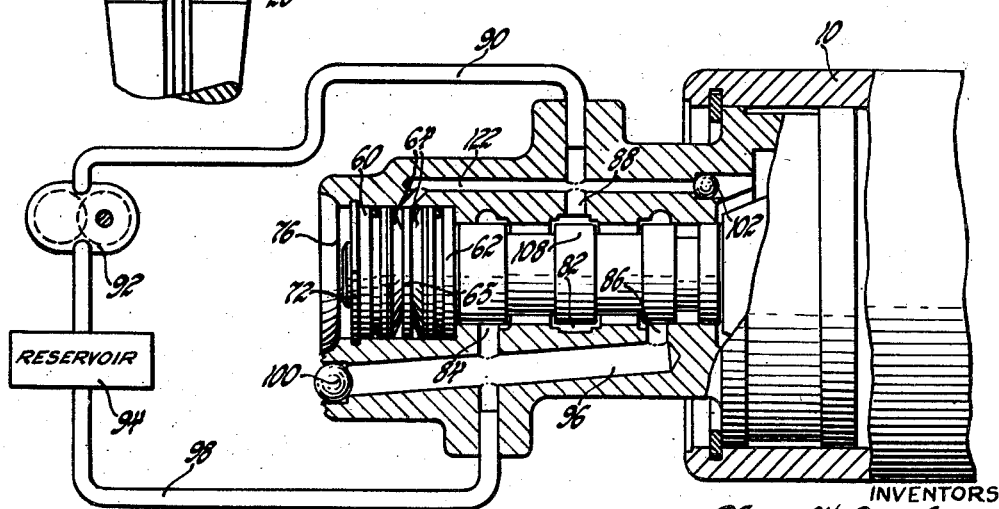
Figure 3 is a detail of the valve component, shown in section.

From Figure 3, it will be observed that the chamber housing the annuli 60 and 62 is at all times in open communication with the pump 92 via a passageway 122 branching from the inlet passageway 88. Thus there is always confined between the two annuli a body of fluid under a pressure corresponding to the pump pressure, which varies with the power demand as set by the steering resistance. This pressure, with the spring washers 64, presents a resistance to movement of the spool in either direction. In other words, the fluid pressure and the spring washers tend to maintain the valve spool centered at all times, a condition which incidentally operates to provide a sense of "feel" at the steering wheel. Significantly, the resistance sensed at the wheel is proportionate to the actual steering resistance.

What we claim is:

1. A fluid power steering gear including a rock shaft confined within a casing lending support thereto, a steering shaft extending into said casing, means within said casing whereby rotary movement of said steering shaft is translated into a rocking motion of said rock shaft, a source of fluid pressure, a fluid motor operable connected to a steering member beyond said rock shaft, and valve means through which said motor means is energized, said valve means being automatically actuated on the application of manual effort to said steering shaft and being positioned coaxially beyond the lower tip end thereof.

2. A fluid power steering gear including a rock shaft having tooth means associated therewith and confined within a casing lending support to said shaft, a steering shaft extending into said casing, means within said casing whereby rotary movement of said steering shaft is translated into a rocking motion of said rock shaft, a source of fluid pressure, a fluid motor operably connected to a steering member beyond said rock shaft, and valve means in circuit with said source and said motor through which the latter is energized, said valve being positioned coaxially beyond the lower tip end of said steering shaft and being actuated by axial movement thereof induced by reactionary thrust thereon.

3. A fluid power steering gear including a rock shaft having tooth means associated therewith and confined within a casing lending support to said shaft, a steering shaft having a worm end extending into said casing, a ball nut carried on said worm and having rack teeth mating with said tooth means, a source of fluid pressure, a power cylinder confining a piston operably connected to a steering member, a valve housing fixed to said casing and having ports therein inter-connecting with ports in said cylinder corresponding to opposite sides of said piston, said housing being in fluid circuit with said source and confining a movable element through which a pressure differential may be created in favor of one side or the other of said piston as determined by the direction said steering shaft is rotated, said valve means being automatically actuated on the application of manual effort to said steering shaft and being positioned coaxially beyond the lower tip end thereof.

4. A fluid power steering gear including a rock shaft having tooth means associated therewith and confined within a casing lending support to said shaft, a steering shaft having a worm end extending into said casing, a ball nut carried on said worm and having rack teeth mating with said tooth means, a source of fluid pressure, a power cylinder confining a piston operably connected to a steering member, a valve housing fixed to said casing and having ports therein interconnecting with ports in said cylinder corresponding to opposite sides of said piston, said housing being in fluid circuit with said source and confining a movable element through which a pressure differential may be created in favor of one side or the other of said piston as determined by the direction said steering shaft is rotated, said valve being positioned coaxially beyond the lower tip end of said steering shaft and being actuated by axial movement thereof induced by reactionary thrust thereon.

5. An open-center fluid power steering valve comprising a pair of telescopically arranged elements, one of which is movable relative to the other, and means providing at one end of the valve a chamber housing a pair of juxta-posed spring washes having shouldering engagement with said elements so as to provide a force tending to maintain the same in centered relation, said chamber being in open communication with the valve inlet whereby there is present therein at all times a body of fluid under a pressure corresponding to the pressure at the valve inlet.

6. A valve comprising a pair of telescopically arranged elements, one of which is movable relative to the other, means defining a chamber at one end of the valve receiving an end portion of the inner of said members, a pair of sealing annuli surrounding such portion of said inner member so as to provide a chamber therebetween, and a pair of juxta-posed spring washers in said chamber, each in abutting relation to one of said annuli and a spacing ring positioned between the two annuli, said washers operating to provide a force tending to maintain said elements in centered relation.

7. A valve construction as defined by claim 6 in which the said chamber is open to the valve inlet so that the centering action of said washers is aided by fluid pressure.

8. A fluid power steering gear including a rock shaft confined within a casing lending support thereto, a steering shaft extending into said casing, means within said casing whereby rotary movement of said steering shaft is translated into a rocking motion of said rock shaft, a source of fluid pressure, fluid motor means operably connected to a steering member, a valve through which said motor means is energized, said valve having a movable part positioned coaxially beyond the lower tip end of said steering shaft, and means interconnecting said steering shaft and said part so that the latter is actuated by axial movement of said steering shaft induced by reactionary thrust, said interconnecting means including a pair of nuts threaded, respectively, on the end of said steering shaft and the adjacent end of said part and further including retainer means for a bearing secured by said first nut and a connector secured by said second nut.

9. A fluid power steering valve comprising a pair of telescopically arranged elements, one of which is movable relative to the other, and means providing at one end of the valve a chamber housing a pair of juxta-posed spring washers having shouldering engagement with said elements so as to provide a force tending to maintain the same in centered relation, said chamber in operation of the valve having communication with the valve inlet whereby working pressure is applied to supplement the action of said washers in resisting relative displacement of said elements.

References Cited in the file of this patent

UNITED STATES PATENTS

| | | |
|---|---|---|
| 2,065,513 | Centervall | Dec. 29, 1936 |
| 2,180,330 | Hey | Nov. 14, 1939 |
| 2,410,049 | Davis | Oct. 29, 1946 |
| 2,505,450 | Wemp | Apr. 25, 1950 |
| 2,609,665 | Rappl | Sept. 9, 1952 |
| 2,685,211 | Haynes et al. | Aug. 3, 1954 |
| 2,691,308 | Lincoln et al. | Oct. 12, 1954 |